(12) United States Patent
Pinno

(10) Patent No.: X9609
(45) Date of Patent: Apr. 21, 1836

(54) SAWING WOOD

(76) Inventor: Joseph Jr. Pinno

Joseph Pinner, Jr Hancock, New Hampshire

Letters Patent.

The Schedule referred to in these Letters Patent and making part of the same containing a description in the words of the said Joseph Pinner Jr himself of his improvement in the Machine for sawing wood.

To all to whom these presents shall come. Be it known that I Joseph Pinner Jr of Hancock in the County of Grafton and State of New Hampshire, have invented a new and useful improvement in the Machine for sawing wood, denominated the balance wheel wood saw machine, and that the following is a full and exact description thereof: I make an outside frame about two feet high, and four feet square, two studs are then added one on each side of the outside frame into which and near the bottom is framed a cross piece; into the cross piece are framed two inside studs running from it to two other cross pieces at the top of the frame which run the other way of it on the top cross pieces and on one side of the frame are placed three iron railways. the saw is then hung on one end of a shaft, and a balance wheel and a whirl on the other end with two bearings, one near the saw and the other between the whirl and balance wheel. I then place a carriage or platform on the frame with a space cut in which for the saw to run; and with trucks four on the edges, and one near the middle, which run on the three railways. a handle or lever is then made with a space cut out for the saw to run in crooked at one end, with iron teeth near the middle to hold the wood, and hinges at the other end, and is hung on the carriage or platform on each side & near the centre of the saw on the carriage or platform, and under the handle or lever is placed, which is held firmly by the handle and pressed up to the saw, a casing is then made to cover the saw and is fastened to the carriage or platform. another casing is made for the balance wheels and fastened to the frame both casings are designed for safety in using. The propelling power is applied to said Machine by a band connecting the whim with said power. it is to be understood that the proportions of the different parts of the Machine can be varied at pleasure. What I claim as my improvement is the construction of the handle or lever; the manner of holding down the wood; the three railways on which the carriage or platform runs backward & forward, together with the general arrangement of the different parts of the whole Machine; and the application of the balance wheel to a circular saw propelled by an endless chain horse power. that kind of power being peculiarly calculated to take advantage of the head way of a balance wheel.

Witnesses
Daniel Blaisdell
Ira Atkins.

Joseph [illegible] Jr

[528 Words